United States Patent
Julien et al.

(10) Patent No.: US 10,427,843 B2
(45) Date of Patent: Oct. 1, 2019

(54) LIQUID DISPENSING SPOUT ASSEMBLY

(71) Applicant: The Plastics Group, Inc., Willowbrook, IL (US)

(72) Inventors: Adam Donald Julien, Oswego, IL (US); Patrick Owen Kelly, Lockport, IL (US)

(73) Assignee: TPG Plastics LLC, Willowbrook, IL (US)

(*) Notice: Subject to any disclaimer, the term of this patent is extended or adjusted under 35 U.S.C. 154(b) by 0 days.

(21) Appl. No.: 15/696,693

(22) Filed: Sep. 6, 2017

(65) Prior Publication Data

US 2018/0065785 A1    Mar. 8, 2018

Related U.S. Application Data

(60) Provisional application No. 62/383,927, filed on Sep. 6, 2016.

(51) Int. Cl.
| | | |
|---|---|---|
| *B65D 47/24* | (2006.01) | |
| *B65D 47/12* | (2006.01) | |
| *B65D 47/32* | (2006.01) | |

(52) U.S. Cl.
CPC ......... *B65D 47/249* (2013.01); *B65D 47/122* (2013.01); *B65D 47/32* (2013.01)

(58) Field of Classification Search
CPC .... B65D 47/249; B65D 47/248; B65D 47/24; B65D 47/241; B65D 47/243; B65D 47/247; B65D 47/32; B65D 47/122
See application file for complete search history.

(56) References Cited

U.S. PATENT DOCUMENTS

| | | | |
|---|---|---|---|
| 4,834,270 | A | 5/1989 | Messner |
| D303,634 | S | 9/1989 | Vachon |
| 4,958,668 | A | 9/1990 | Vachon |
| 5,067,639 | A | 11/1991 | Maguire et al. |
| 5,944,224 | A | 8/1999 | Hodge et al. |
| 5,988,458 | A | 11/1999 | Messner |
| 6,155,464 | A | 12/2000 | Vachon |
| 6,318,604 | B1 | 11/2001 | Messner |
| 6,390,153 | B1 | 5/2002 | Flider et al. |
| 7,089,975 | B2 | 8/2006 | Chrisco et al. |
| 8,038,035 | B2 | 10/2011 | Forbis |
| 8,403,185 | B2 | 3/2013 | Vachon |
| 8,561,858 | B2 | 10/2013 | Vachon |
| 8,567,646 | B1 | 10/2013 | Cray |
| 8,800,826 | B2 | 8/2014 | Forbis et al. |
| 8,950,637 | B2 | 2/2015 | Wilkins |
| 2009/0090745 | A1* | 4/2009 | Forbis ............... B65D 25/48 222/153.14 |
| 2012/0118431 | A1* | 5/2012 | Dickie ............... B65D 25/48 141/311 R |

(Continued)

*Primary Examiner* — Donnell A Long
(74) *Attorney, Agent, or Firm* — Christopoher G. Darrow; Darrow Mustafa PC

(57) ABSTRACT

A liquid dispensing spout assembly is provided that includes a housing having a first cylindrical portion and a second cylindrical portion attached at an angle to the first cylindrical portion, a spout attached to a the second cylindrical housing, a vent disposed inside a lower portion of the first cylindrical housing, the second cylindrical housing, and the spout, and a valve assembly disposed inside the first cylindrical portion.

20 Claims, 21 Drawing Sheets

(56) References Cited

U.S. PATENT DOCUMENTS

| | | | |
|---|---|---|---|
| 2014/0190988 A1* | 7/2014 | Hickey | B67D 7/005 |
| | | | 222/484 |
| 2015/0368005 A1* | 12/2015 | Wilkinson | B65D 25/48 |
| | | | 222/1 |
| 2016/0145012 A1* | 5/2016 | Gaikwad | B65D 47/32 |
| | | | 222/1 |

* cited by examiner

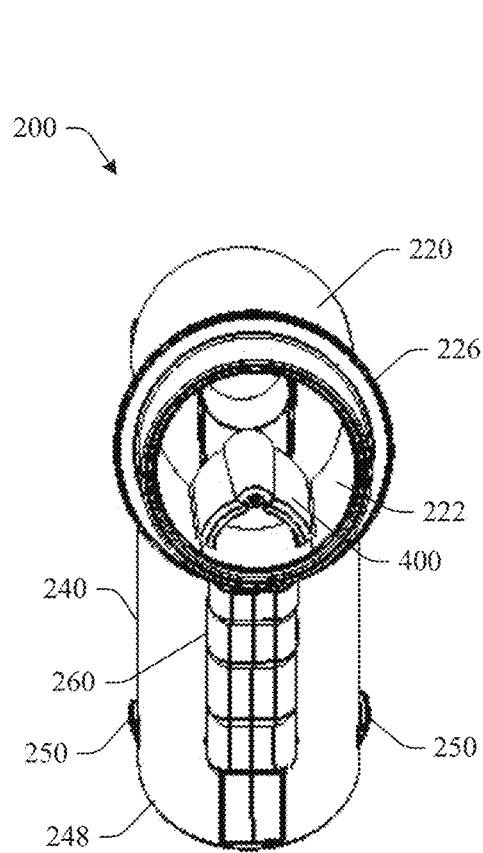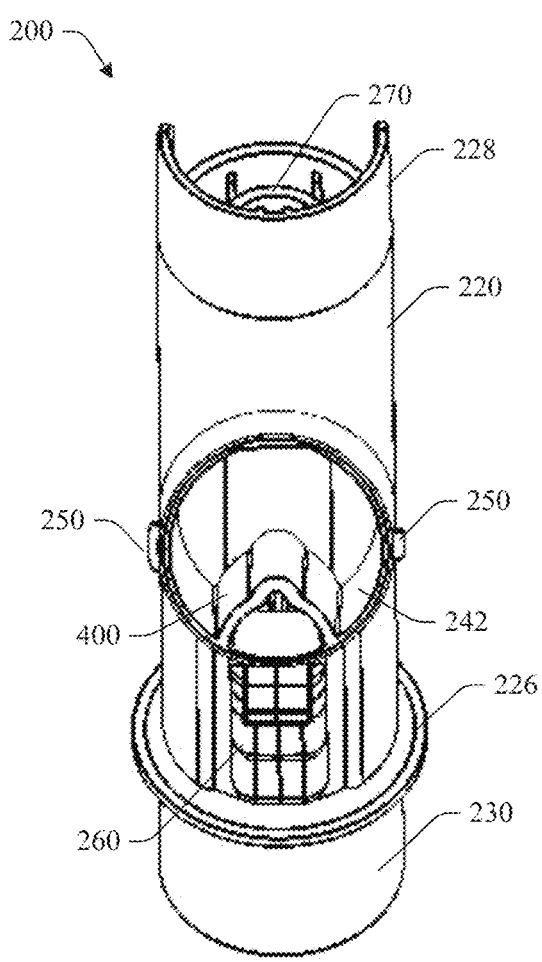
FIG. 10
FIG. 11

LIQUID DISPENSING SPOUT ASSEMBLY

CROSS-REFERENCE TO RELATED APPLICATIONS

This application claims the benefit of U.S. Provisional Patent Application Ser. No. 62/383,927 entitled "Liquid Dispensing Spout Assembly" filed on Sep. 6, 2016, the entirety of which is incorporated by reference herein.

ORIGIN

The innovation disclosed herein relates to a liquid dispensing spout and more specifically, to a spout assembly for dispensing a liquid from a container that includes safety features, including child-safety features.

BACKGROUND

Safety is a major concern in the design and manufacturing of containers for transporting potentially hazardous liquids. In particular, it is important for portable containers for transporting potentially hazardous liquids (e.g., gasoline or other flammable liquids) to be designed to eliminate or reduce the likelihood of spillage, puncture, combustion, or explosion. These containers should also include child safety features.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

In an aspect of the innovation, a liquid dispensing spout assembly is provided that includes a housing having a first cylindrical portion and a second cylindrical portion attached at an angle to the first cylindrical portion, a spout attached to a the second cylindrical housing, a vent disposed inside a lower portion of the first cylindrical housing, the second cylindrical housing, and the spout, and a valve assembly disposed inside the first cylindrical portion.

In another aspect of the innovation, a method of dispensing liquid from a container is provided that includes pressing a flexible portion of a trigger mechanism toward a valve shaft, pushing the trigger mechanism toward the container, moving a dispensing mechanism toward the container, displacing a plunger from apertures defined in the valve shaft, and dispensing liquid from the container.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

FIG. 10 is a bottom view of the housing of the spout assembly in accordance with an aspect of the innovation.

FIG. 11 is a front view of the housing of the spout assembly in accordance with an aspect of the innovation.

DETAILED DESCRIPTION

Figure 1:
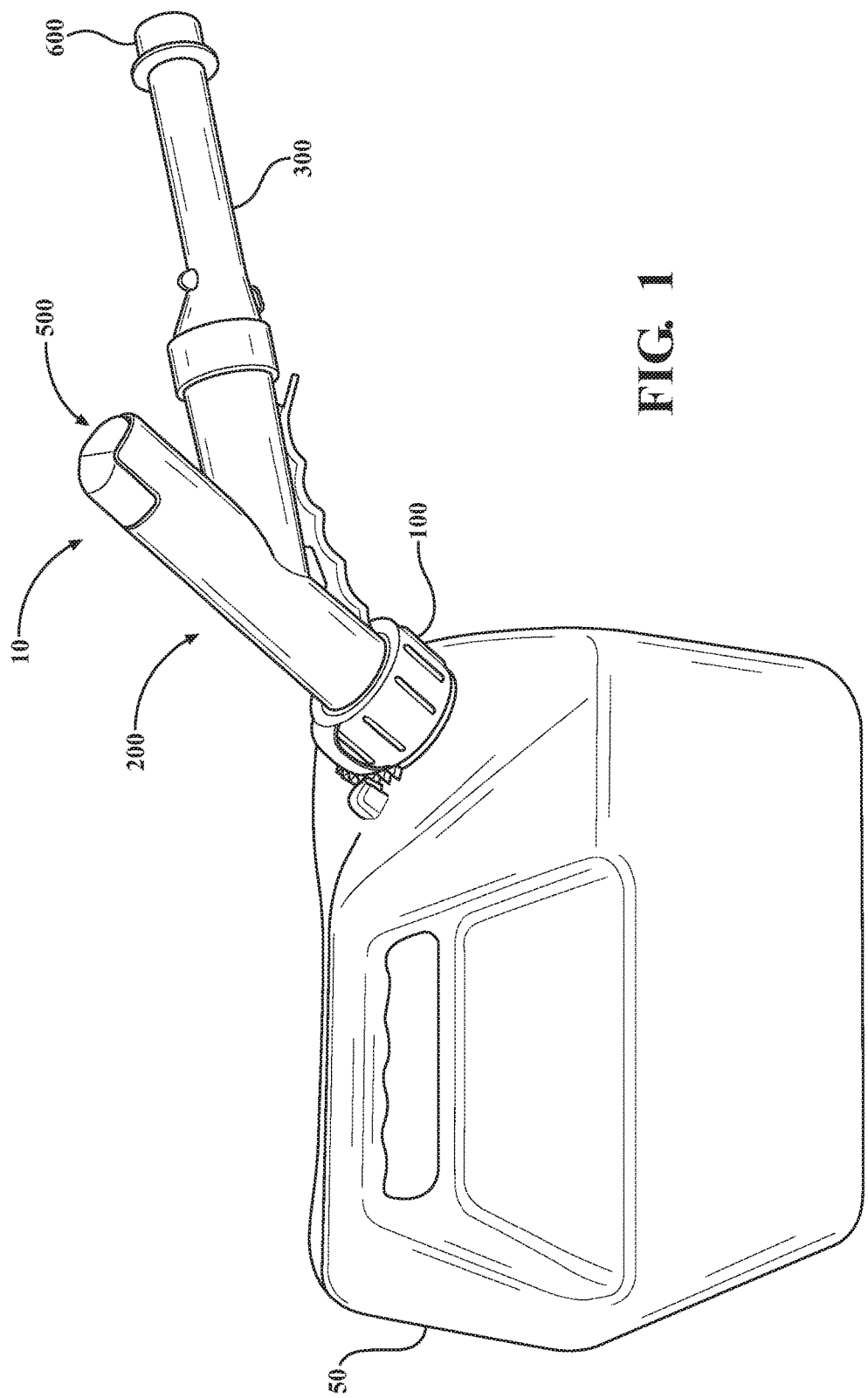
FIG. 1 is a top-side view of a spout assembly attached to a container in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

While specific characteristics are described herein (e.g., thickness, orientation, configuration, etc.), it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Referring now to the drawings, FIG. 1 is a side view of a spout assembly 10 for the dispensing of liquids from a container 50 in accordance with an aspect of the innovation. More specifically, the spout assembly 10 attaches to container 50 that may or may not hold a hazardous liquid (e.g., gasoline, kerosene, etc.). The spout assembly 10 has childproof features that are designed to prevent a child from: 1) removing the spout assembly 10 from the container 50, and 2) dispensing the liquid from inside the container 50.

In one example embodiment illustrated in FIGS. 1-16, the spout assembly 10 includes an attachment cap 100, a housing 200, a spout 300, a vent 400, a valve assembly 500, and a dust cap 600.

Figure 2:
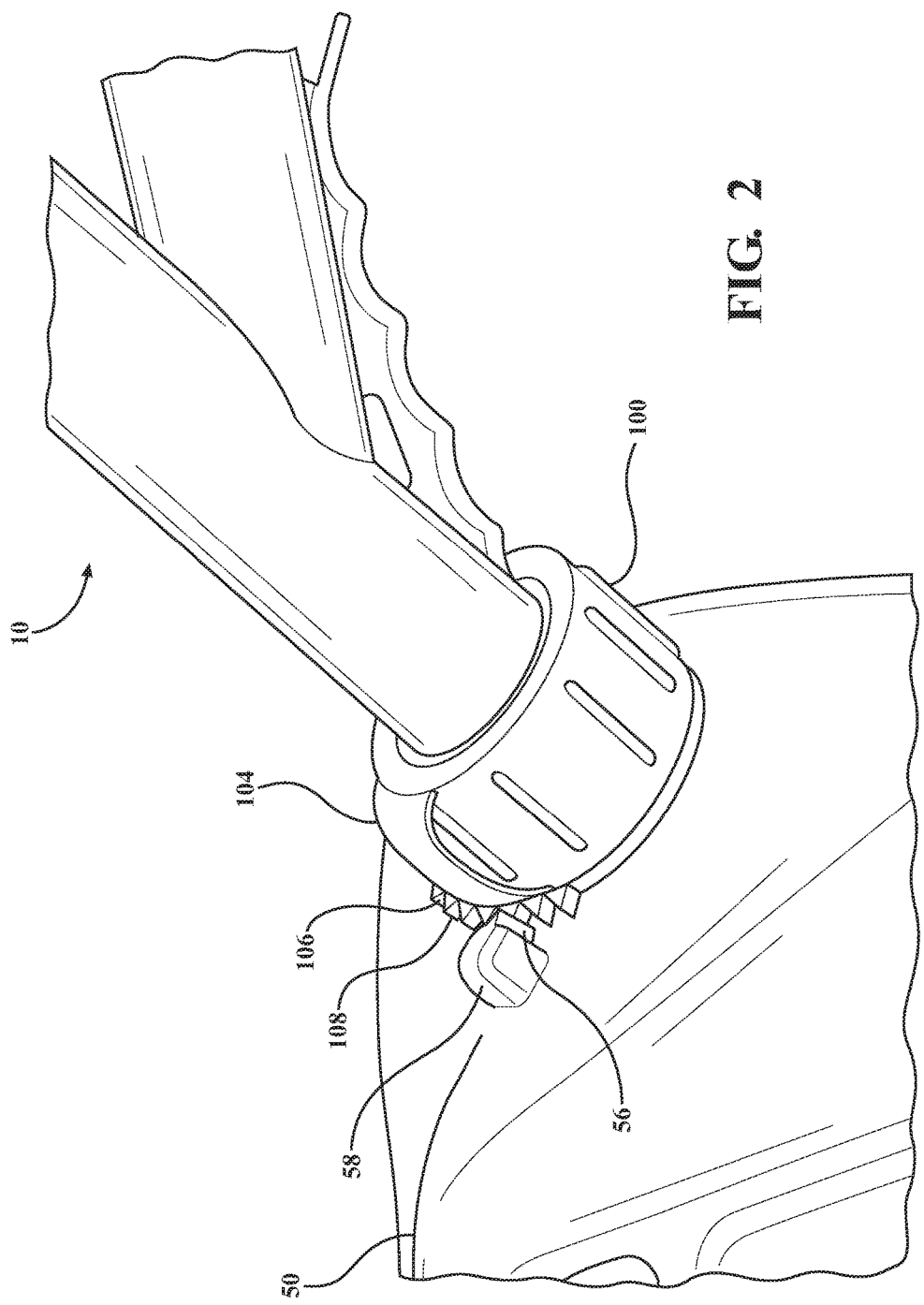
FIG. 2 is a close up of the spout assembly attached to the container in accordance with an aspect of the innovation.
Figure 3:
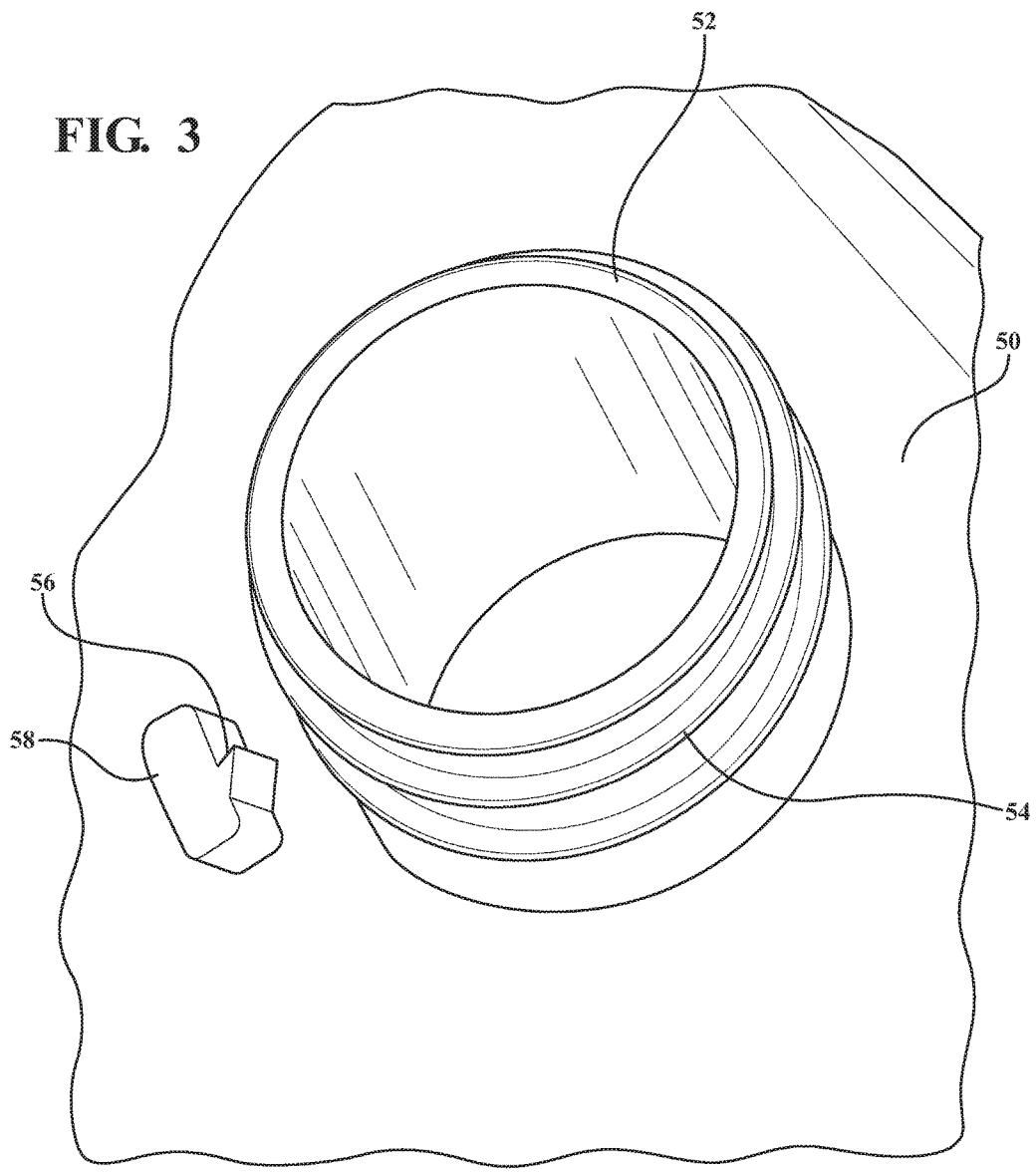
FIG. 3 is a close up view of the container spout in accordance with an aspect of the innovation.
Figure 4A:
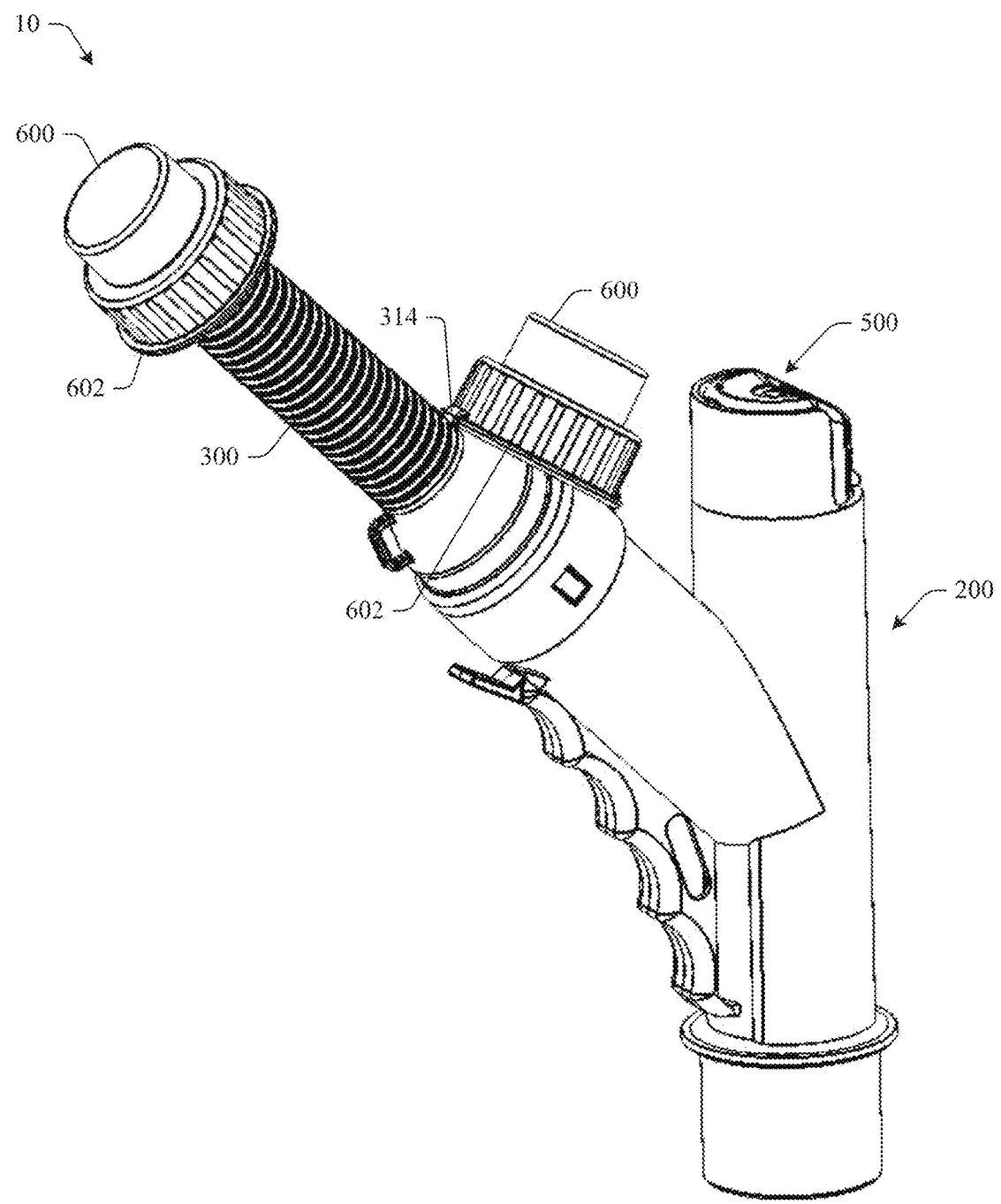
FIGS. 4A and 4B are front perspective views of an example spout assembly with and with a dust cap respectively in accordance with an aspect of the innovation.
Figure 4B:
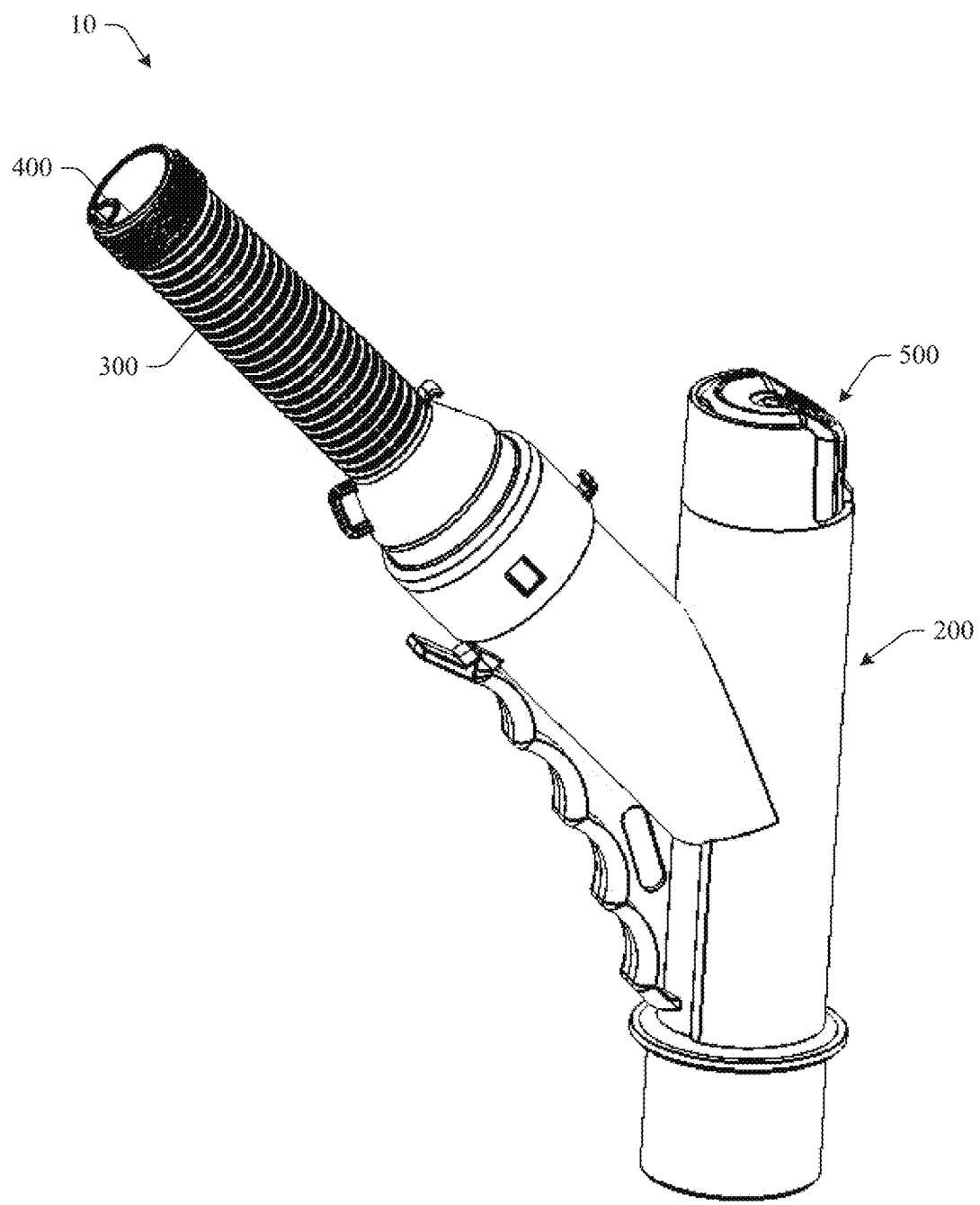
Figure 5A:
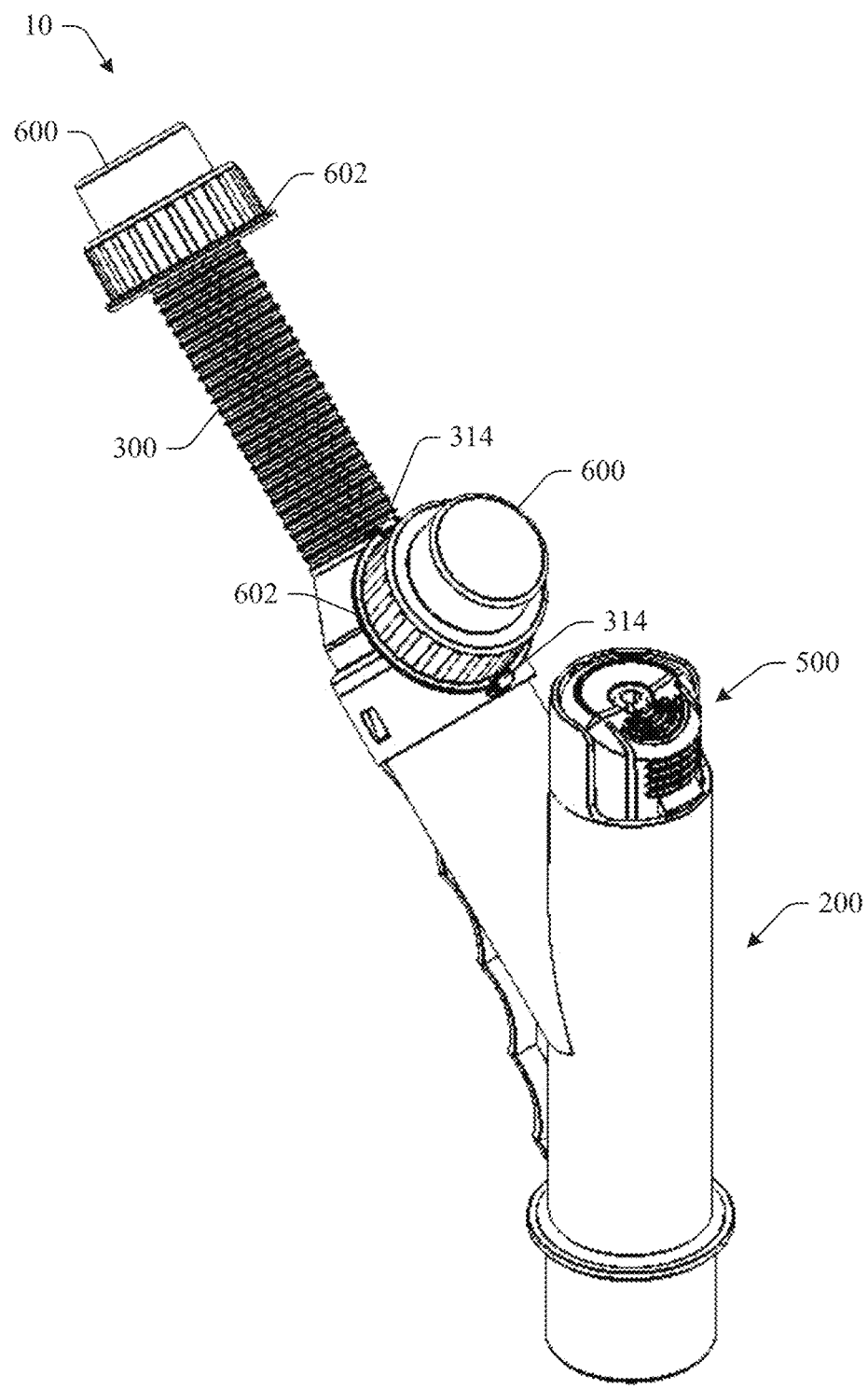
FIGS. 5A and 5B are rear perspective views of the example spout assembly with and with a dust cap respectively in accordance with an aspect of the innovation.
Figure 5B:
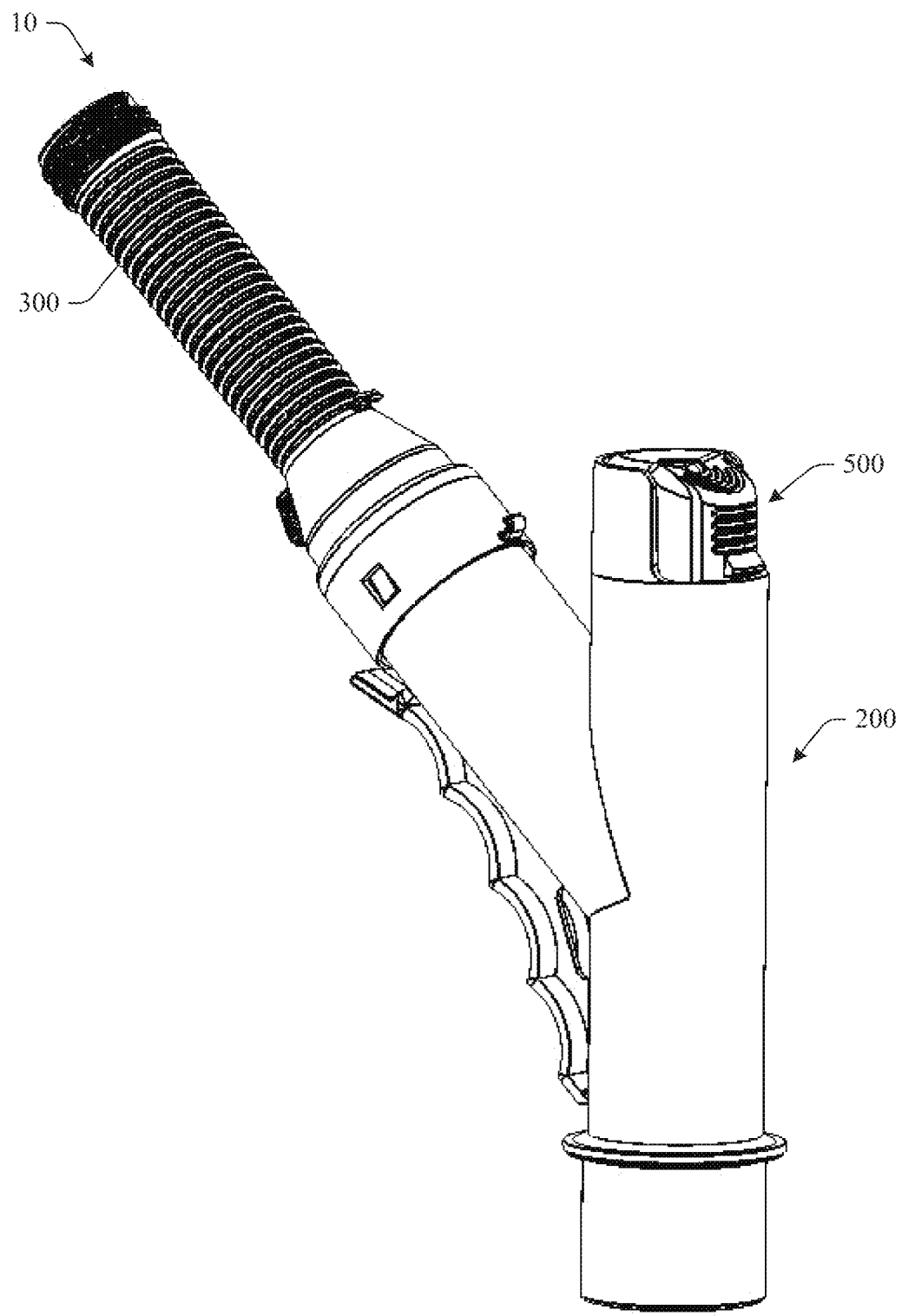
Figure 6:
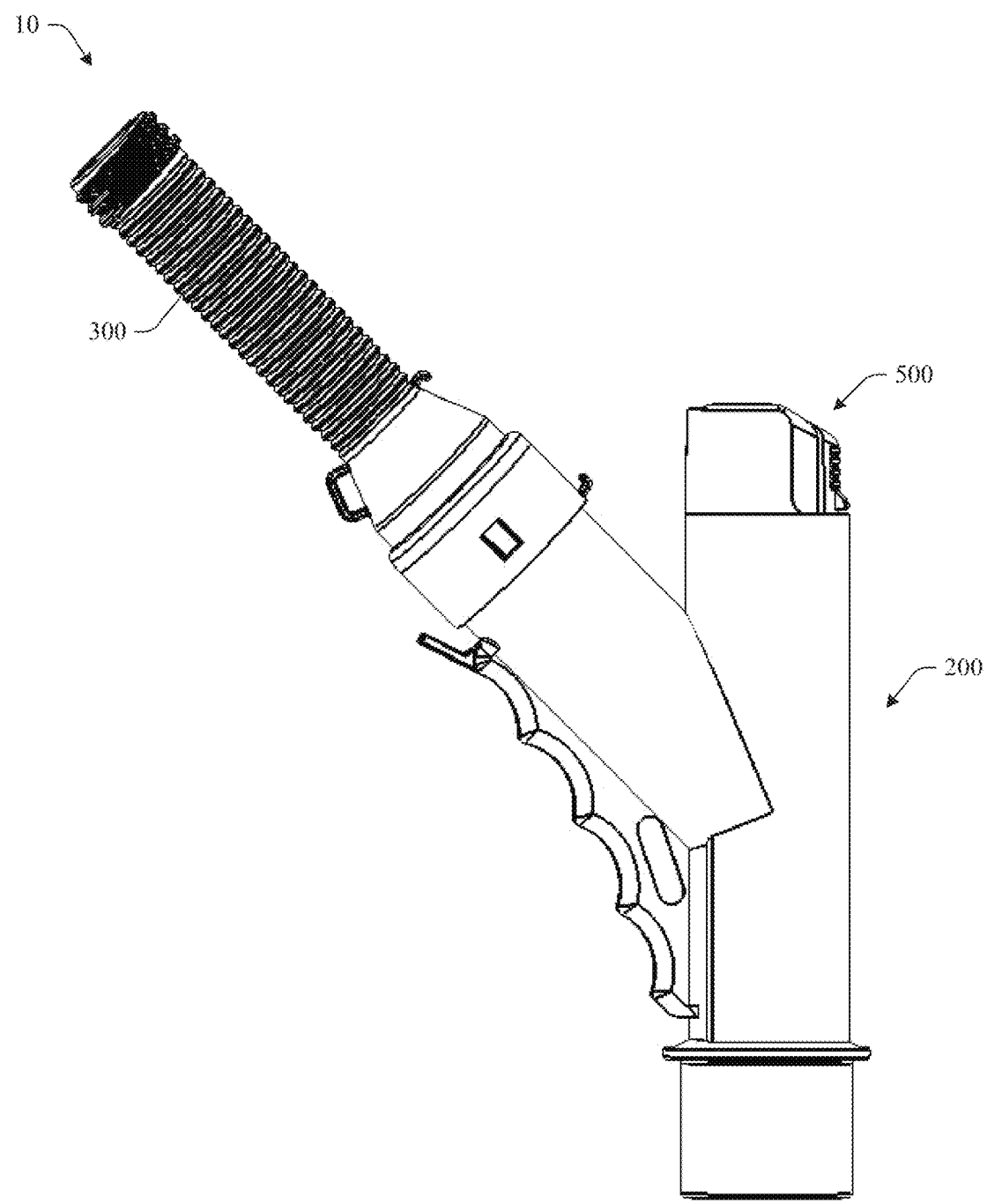
FIG. 6 is a left side view of the spout assembly in accordance with an aspect of the innovation.
Figure 7:
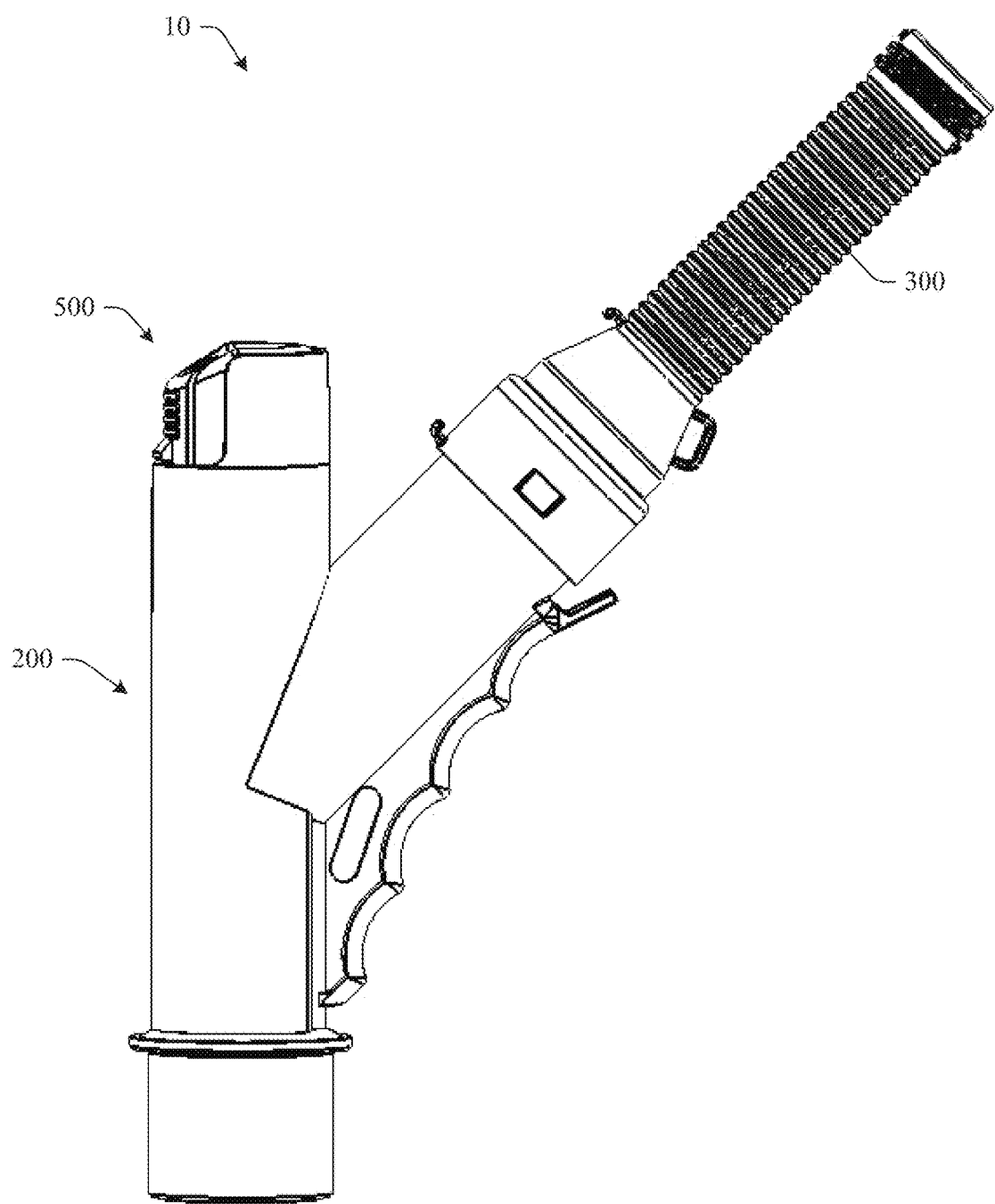
FIG. 7 is a right side view of the spout assembly in accordance with an aspect of the innovation.
Figure 8:
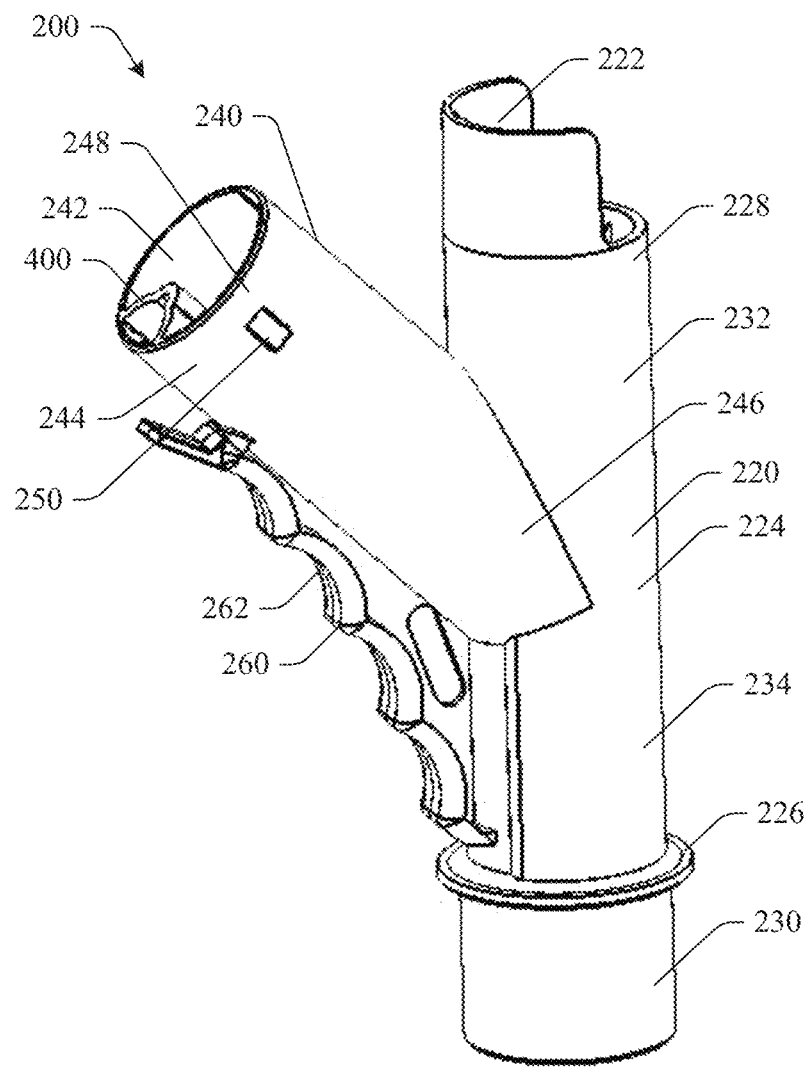
FIG. 8 is a front perspective view of a housing of the spout assembly in accordance with an aspect of the innovation.
Figure 9:
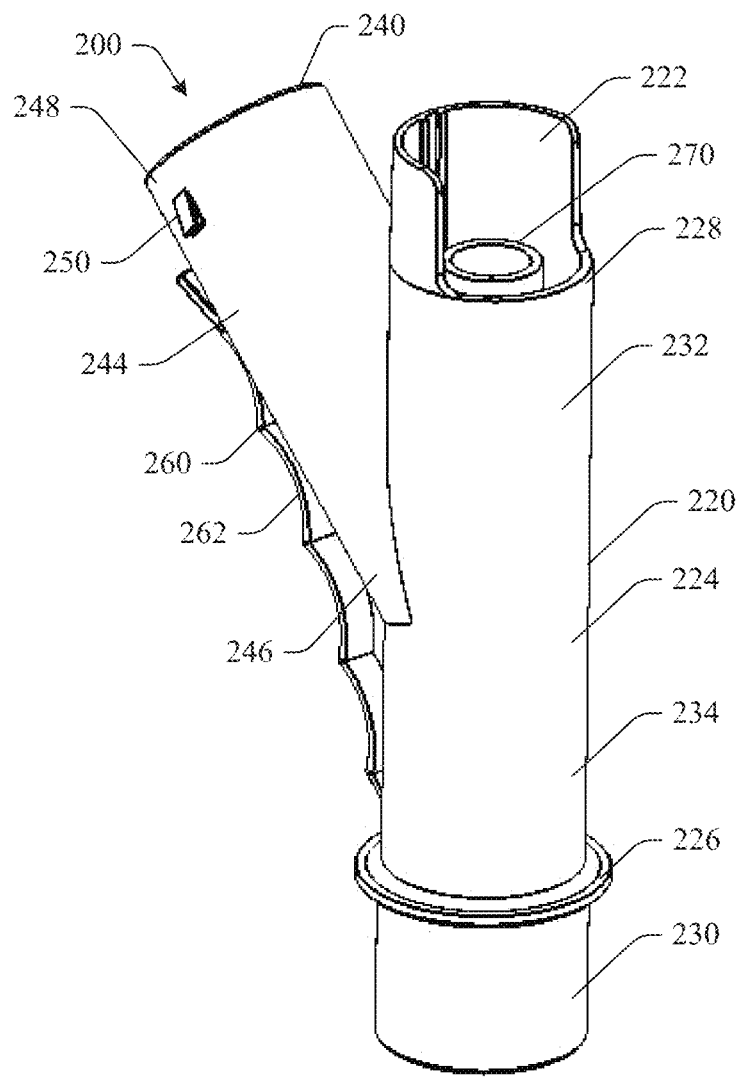
FIG. 9 is a rear perspective view of the housing of the spout assembly in accordance with an aspect of the innovation.

Referring to FIGS. 1-3, the attachment cap 100 attaches the spout assembly 10 to a raised (spout) opening 52 defined in the container 50 via the housing 200, as will be explained further below. The attachment cap 100 may attach the spout assembly 10 to the raised opening via any mechanical means, such as but not limited to, threading, snapping, twisting, etc. In the example embodiment illustrated in the figures, the attachment cap 100 includes internal threads (not shown) that thread to external threads 54 on the raised opening 52 of the container 50. It is to be understood, however, that the example embodiment described herein and illustrated in the figures is for illustrative purposes only and is not intended to limit the scopes of the innovation.

The cap 100 further includes at least one of the above mentioned child-proof features. Specifically, according to an example of the innovation, the cap 100 may include a flexible extension part 104 that extends over an outer surface of the cap 100. The flexible extension part 104 includes an engagement part 106 that has outwardly extending teeth 108. When spout assembly 10 is installed on the container 50, the cap 100 is screwed on to the raised opening 52 until tight. The teeth 108, in turn, engage one or more teeth 56 on a projection 58 on the container 50 in a ratcheting fashion. In order to remove the spout assembly 10, the user must press the flexible extension part 104 toward the cap 100 and away from the projection 56 to disengage the cap 100 from the projection 56. At that time, the cap can be unscrewed or untightened from the raised opening 52 and removed.

Referring to FIGS. 8-11, the housing 200 has a first cylindrical portion 220 and a second cylindrical portion 240 that extends at an angle from the first cylindrical portion 220. The first cylindrical portion 220 has an inside surface 222, an outside surface 224, a flange 226, a first end 228, and an insertion portion (second end) 230 disposed below the flange 226. The insertion portion 230 is inserted into the raised opening 52 of the container 50 up to the point where the flange 226 meets a top rim of the raised opening 52 on the container 50. As mentioned above, the cap 100 is then tightened to the raised opening 52 to secure the spout assembly 10 to the container 50.

The first cylindrical portion 220 further includes a first (upper) portion 232 and a second (lower) portion 234. The first portion 232 is disposed between where the second cylindrical portion 240 attaches to the first cylindrical portion 220 and the first end 228 of the first cylindrical portion 220. The second portion 234 is disposed between the flange 226 and where the second cylindrical portion 240 attaches to the first cylindrical portion 220.

The second cylindrical portion 240 has an inside surface 242, an outside surface 244, a first (proximate) end 246 that attaches to the first cylindrical portion 220 at an angle that facilitates dispensing of the liquid, and a second (distal) end 248. Projections 250 are disposed on the second end 248 that facilitate attachment of the spout 300 to the second end 248 of the second cylindrical portion 240, as will be subsequently described further below.

Still referring to FIGS. 8-11, the housing 200 further includes a grip portion 260 attached to the outside surface 224 of the lower portion 234 of the first cylindrical portion 220 and the outside surface 244 of the second cylindrical housing 240. The grip portion 260 includes curved indentations 262 that facilitate the gripping of the spout assembly 10 during the liquid dispensing process.

Still referring to FIGS. 8-11, the housing further includes a valve support device 270 disposed inside the first cylindrical portion 220. The valve support device 270 receives and secures the valve assembly 500 inside the first cylindrical portion 220.

Figure 12:
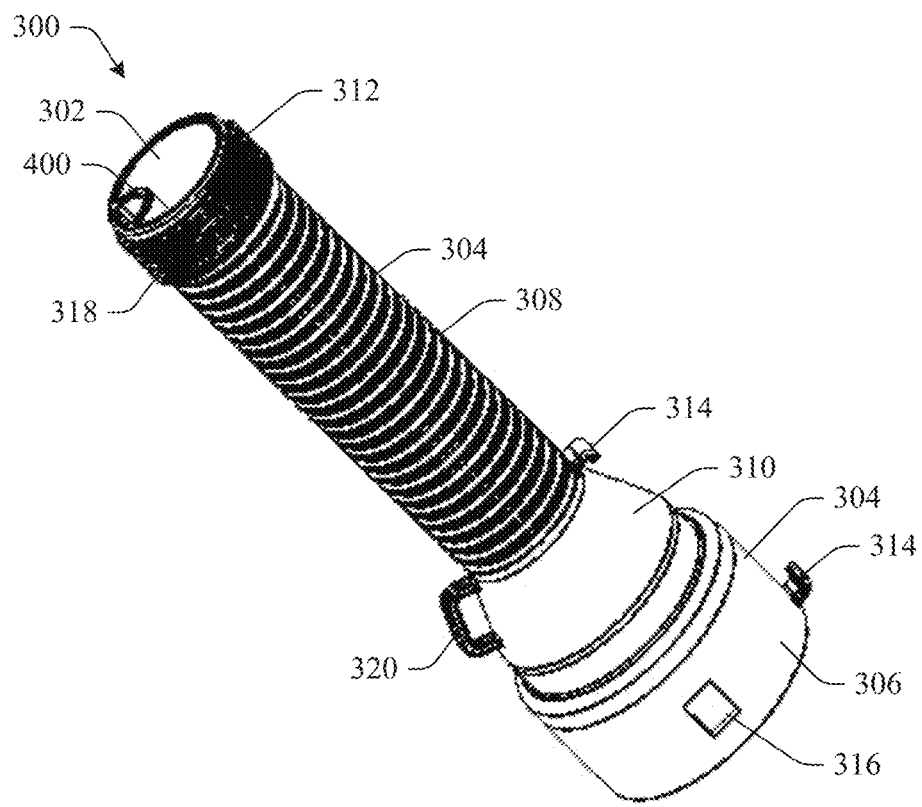
FIG. 12 is a front perspective view of a spout of the spout assembly in accordance with an aspect of the innovation.
Figure 13:
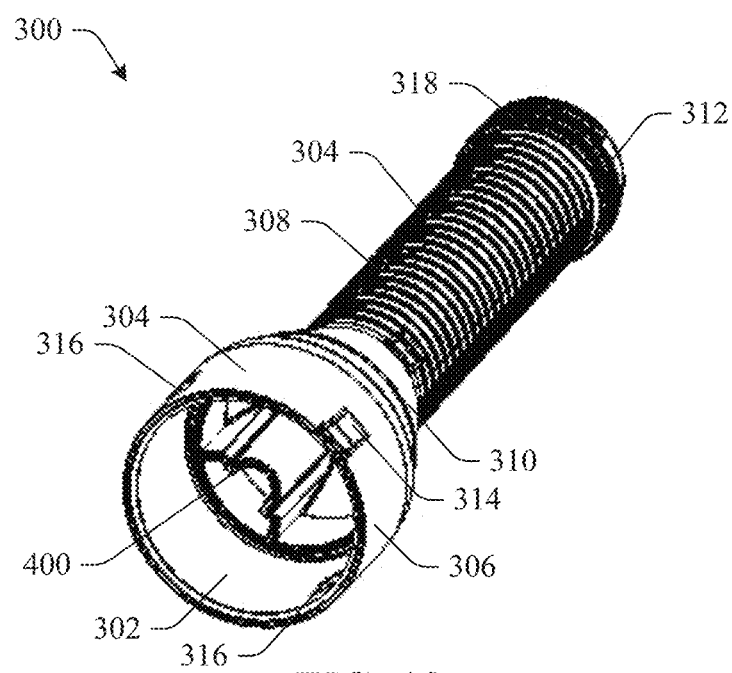
FIG. 13 is a rear perspective view of the spout of the spout assembly in accordance with an aspect of the innovation.
Figure 15:
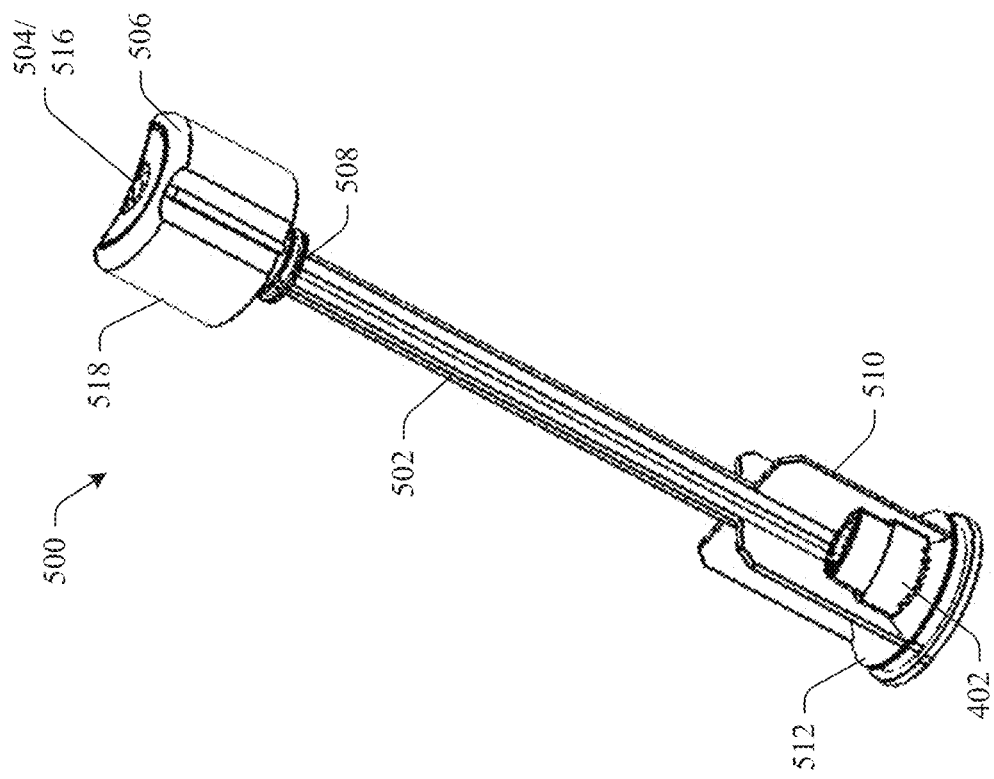
FIGS. 14 and 15 are opposite side perspective views of a valve assembly of the spout assembly in accordance with an aspect of the innovation.
Figure 14:
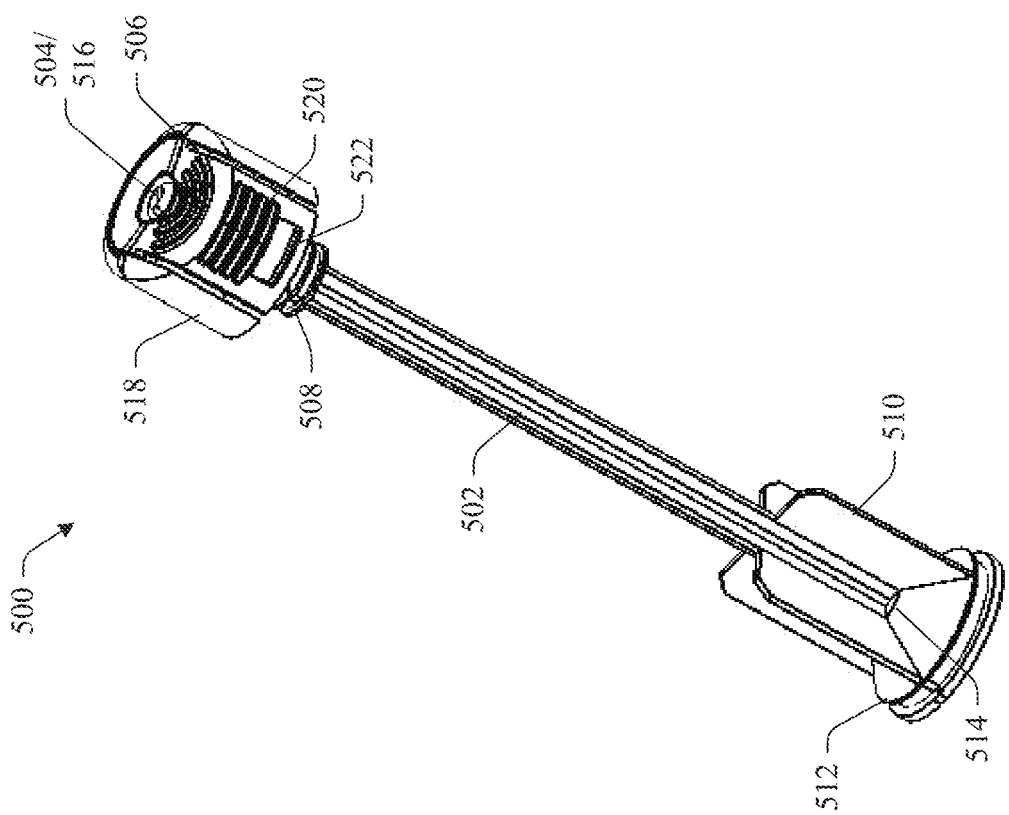

Referring to FIGS. 12 and 13, the spout 300 has an inside surface 302, an outside surface 304, an attachment (proximate) end 306, a body segment 308, a transition portion 310, a second (distal/dispensing) end 312, and a dust cap storage device 314. The attachment end 306 includes apertures 316 that engage the projections 250 to thereby facilitate attachment of the spout 300 to the second end 234 of the second cylindrical portion 240. In one embodiment, the spout includes a body segment 308 made from a material that allows the body segment 308 to flex during dispensing of the liquid. In one embodiment, the body segment 308 may be ribbed. In another embodiment, the body segment 308 is not ribbed. The transition portion 310 has a cylindrical funnel shape that provides a connection between the attachment end 306. The second end 312 is configured to receive the dust cap 600 (see e.g., FIG. 4A) when liquid is not being dispensed. The second end 312 may include threads 318 to threadedly receive the dust cap 600. It is to be understood that most any means for receiving the dust cap 600 may be utilized. In other embodiments, the dust cap 600 can slide, snap, twist, etc. to the second end 312 of the spout 300. In another embodiment, a tethering device may be included to tether the dust cap 600 when liquid is being dispensed. In one embodiment, the dust cap storage device 314 includes tabs that engage a lip 602 on the dust cap 600 to hold the dust cap 600 in place during liquid dispensing. It is to be understood that the dust cap may be stored in most any location on the container that is convenient for use.

Figure 17:
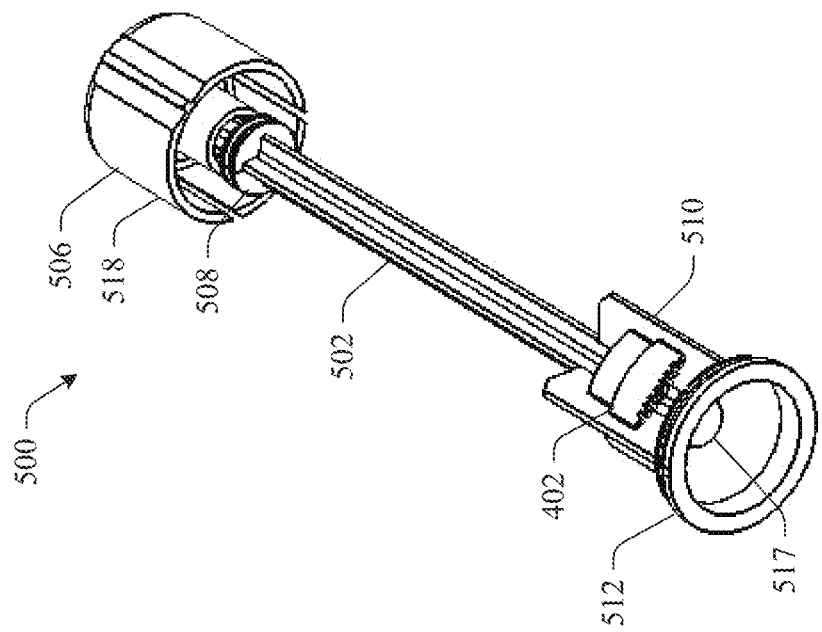
FIGS. 16 and 17 are opposite side bottom perspective views of a valve assembly of the spout assembly in accordance with an aspect of the innovation.
Figure 16:
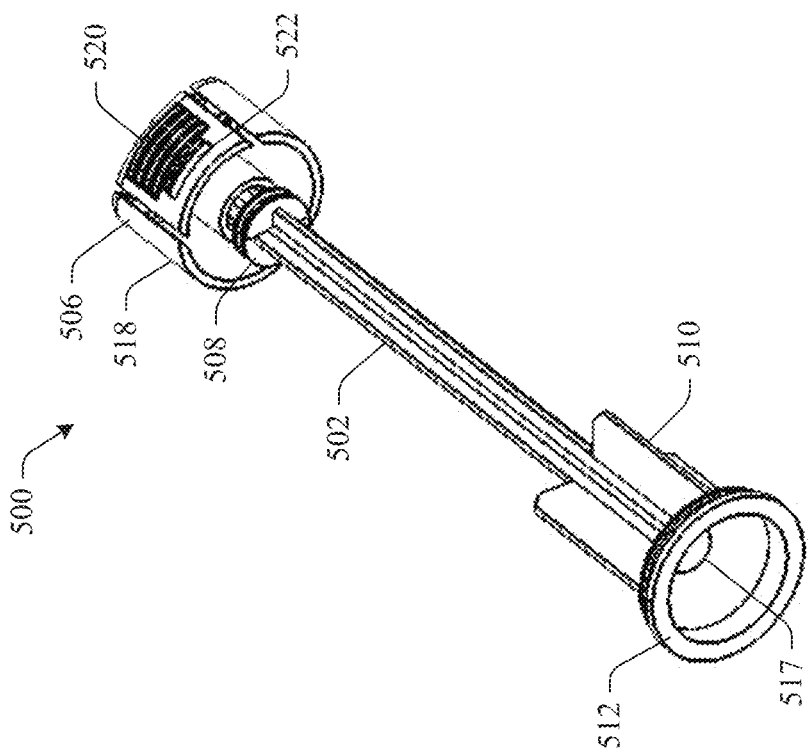
Figure 18:
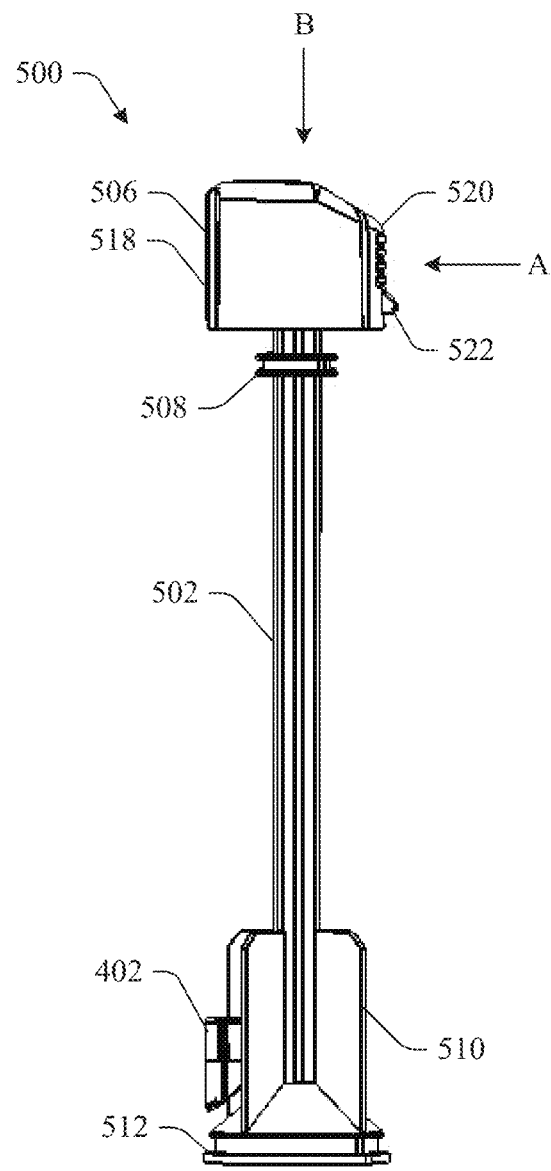
FIG. 18 is a side view of the valve assembly of the spout assembly in accordance with an aspect of the innovation.
Figure 20:
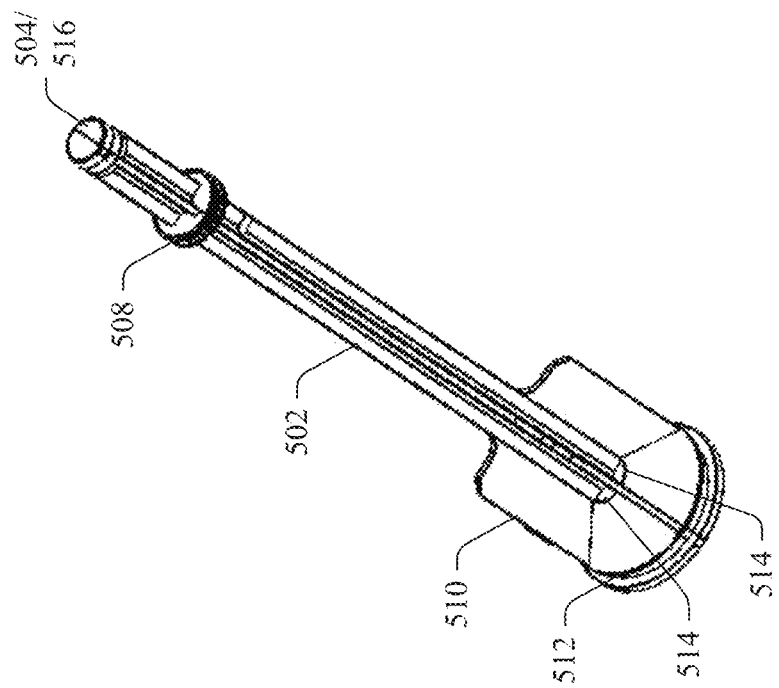
FIG. 20 is a top perspective view of the valve shaft of the spout assembly in accordance with an aspect of the innovation.
Figure 19:
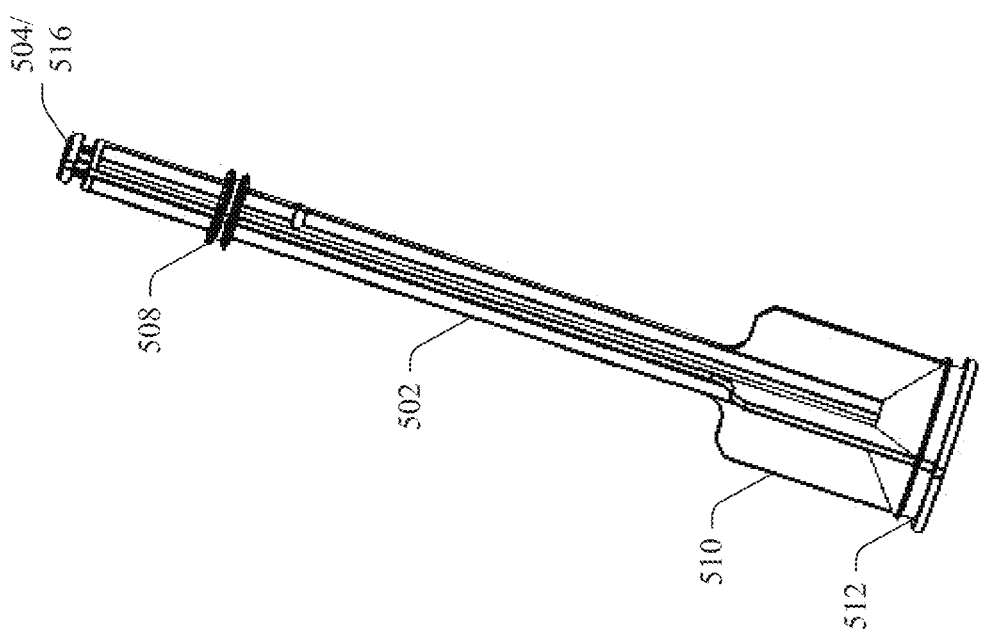
FIG. 19 is a perspective view of a valve shaft of the spout assembly in accordance with an aspect of the innovation.

As shown in FIGS. 8 and 10-13, according to an example embodiment of the innovation the vent 400 extends along the inside surface 302 of the spout 300, and along the inside surface 242 of the second cylindrical portion 240, and continues along the inside surface 222 of the lower portion 230 of the first cylindrical portion 220 downward past the flange 226 and terminates in a vent plug 402 (see FIGS. 15 and 17) disposed on a valve shaft described further below.

The vent 400 permits a return air flow during dispensing the liquid to facilitate the flow of the liquid from the container 50.

Referring to FIGS. 14-19, the valve assembly 500 is disposed inside the first cylindrical portion 220 and includes a valve shaft 502, a dispensing mechanism 504 disposed inside the valve shaft 502, a trigger mechanism 506, and an O-ring 508 disposed on the valve shaft 502 that acts as a stop for the trigger mechanism 506. In one embodiment, the valve shaft 502 extends from the first end 228 of the first cylindrical portion 220 to the second end 230 of the first cylindrical housing 220. The valve shaft 502 may include fins 510 and/or a liquid stop mechanism 512 that facilitate support and prevent liquid from being dispensed from the container 50 prior to actuation of the trigger mechanism 506. In one embodiment, apertures 514 are defined in the stop mechanism 512 to allow liquid to flow from the container 50 once the dispensing mechanism 504 is actuated.

The dispensing mechanism 504 is disposed inside the valve shaft 502 and includes a spring/actuation device 516 that biases the dispensing mechanism 504 back to a closed position once the trigger mechanism 506 is released. A plunger 517 is disposed at a bottom of the dispensing mechanism 504 that opens and closes the apertures 514 to allow and prevent the flow of the liquid.

The trigger mechanism 506 is attached to a top of the valve shaft 502 and engages the actuation device 516 on the dispensing mechanism 504. The trigger mechanism 506 includes a dual acting cap 518 having a flexible portion 520 and a tab 522 disposed on the flexible portion 520. Actuating the valve assembly 500 is a two-step process. First, the user must press the flexible portion 520 toward the valve shaft 502 in a direction indicated by the arrow A (see FIG. 18) until the tab 522 clears a top of the first end 228 of the first cylindrical portion 220. Second, the user then pushes on the dual acting cap 518 toward the container 50 as indicated by the arrow B in FIG. 18. This motion moves the dispensing mechanism 504 toward the container 50 and displaces the plunger 517 from the apertures 514 thus, opening up the apertures 514 in the liquid stop mechanism 512 thereby allowing liquid to flow from the container 50. In this dispensing (open) position, the tab 522 is inside the first end 228 of the first cylindrical portion 220.

Once the liquid is dispensed, the user releases the dual acting cap 518 and the spring/actuation device 516 biases the dispensing mechanism 504 upward away from the container 50 (opposite direction of arrow B) thereby allowing the plunger 517 to close the apertures 514 and prevent any further dispensing of the liquid. When the dispensing mechanism 504 is biased back to the non-actuating position, the tab 522 is no longer inside the first cylindrical portion 220 and the flexible portion 520 is biased in a direction away from the valve shaft (opposite direction of arrow A). This causes the tab 522 to extend over the top rim of the first end 228 of the first cylindrical portion 220. Thus, if a user attempts to activate the valve assembly 500 without first activating the flexible portion 520, the tab 522 will contact the top rim of the first end 228 of the first cylindrical portion 520 thereby preventing any dispensing of the liquid.

Referring back to FIGS. 4A and 5A, the dust cap 600 attaches to the second end 312 (see e.g., FIG. 12) of the spout 300 as described above and is configured to prevent dust, dirt, etc. from entering the spout 300. The dust cap 600 includes a lip 602 that engages the dust cap storage device (tabs) 314 described above to store the dust cap 600 during liquid dispensing.

Figure 21:
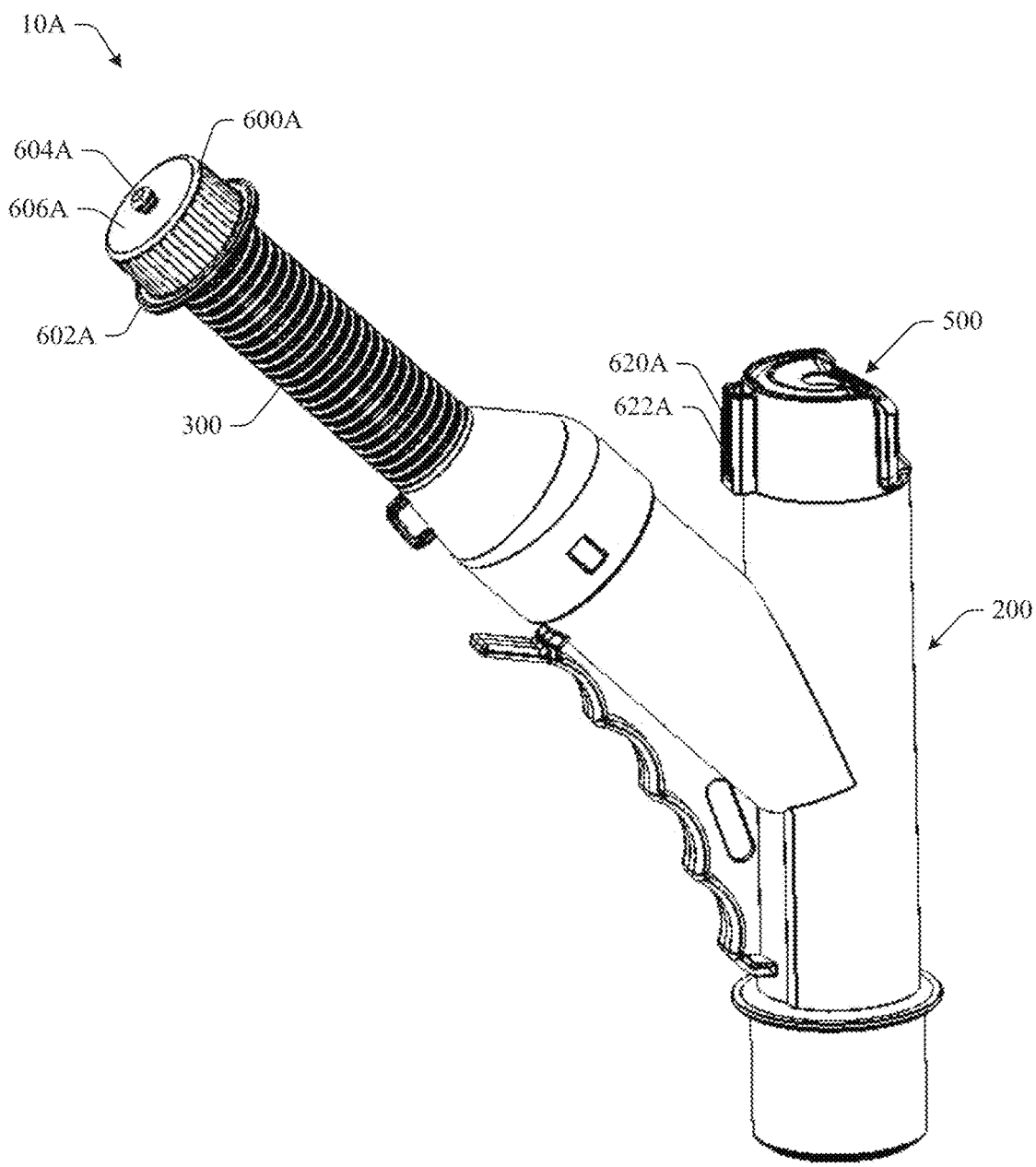
FIGS. 21 and 22 are front and rear perspective views respectively of another example spout assembly with a dust cap in accordance with an aspect of the innovation.
Figure 22:
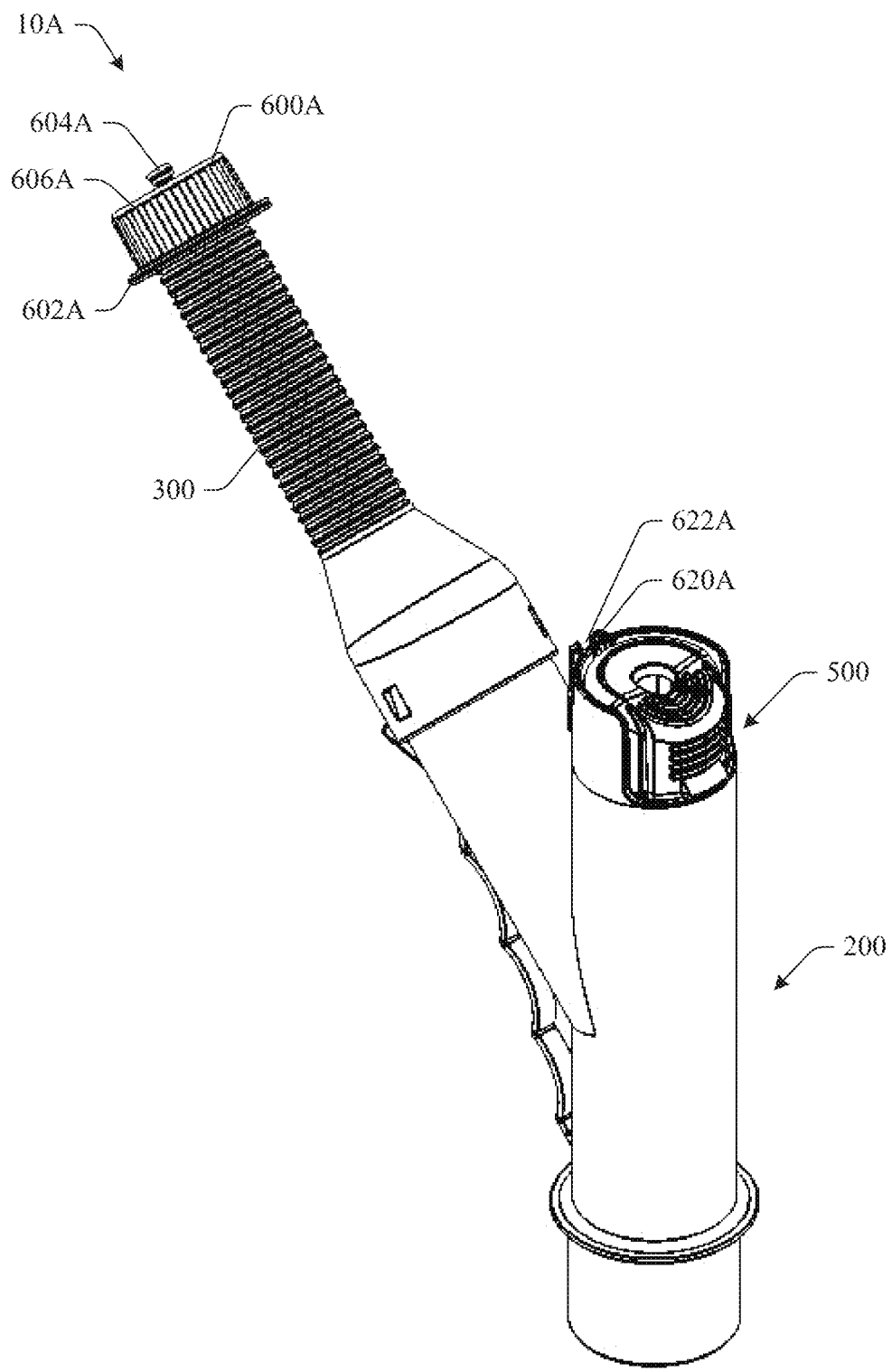
Figure 23:
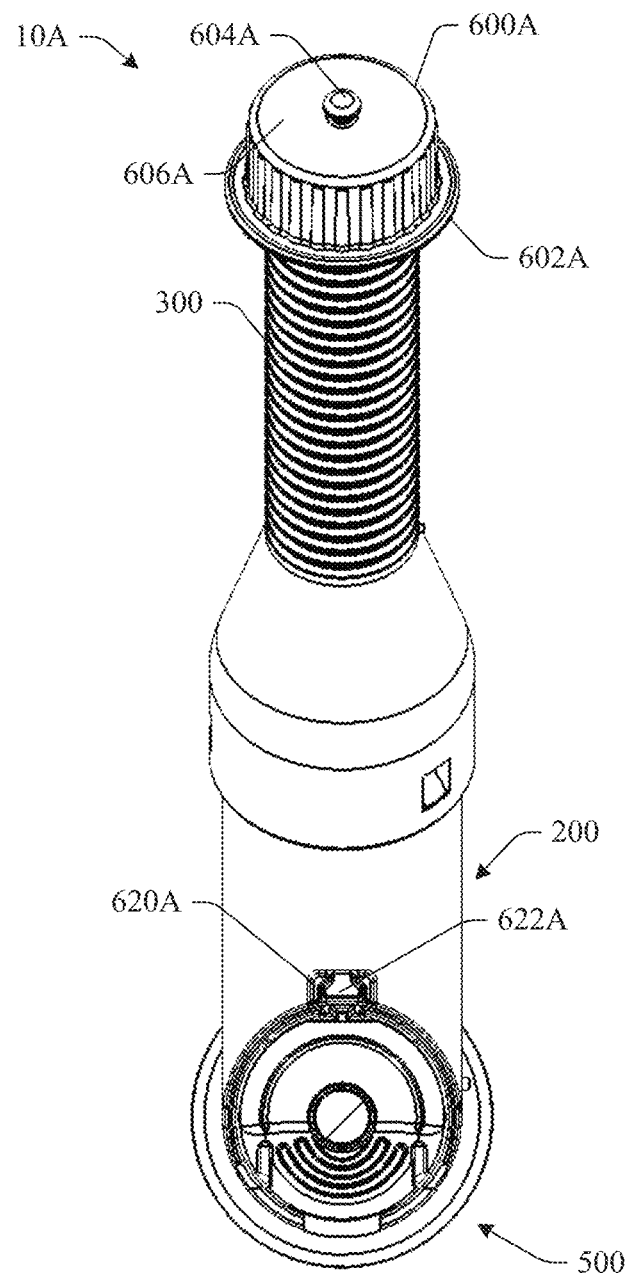
FIG. 23 is a top view of the spout assembly in FIGS. 21 and 22 in accordance with an aspect of the innovation.

FIGS. 21-23 illustrate another example embodiment of a spout assembly 10A in accordance with an aspect of the innovation. This example embodiment is similar to the example embodiment described above in that it also includes an attachment cap 100, a housing 200, a spout 300, a vent 400, and a valve assembly 500. Thus, the details of these features will not be repeated.

This example embodiment, however, includes an alternate dust cap 600A and alternate dust cap storage device 620A. The dust cap 600A includes a lip 602A and a projection 604A that extends out a top 606A of the dust cap 600A. The dust cap storage device 620A is attached to a top of the first cylindrical portion 220 described above and includes a channel 622A. To store the dust cap 600A during dispensing of the liquid the user simply slides the projection 604A into the channel 622A.

Figure 24:
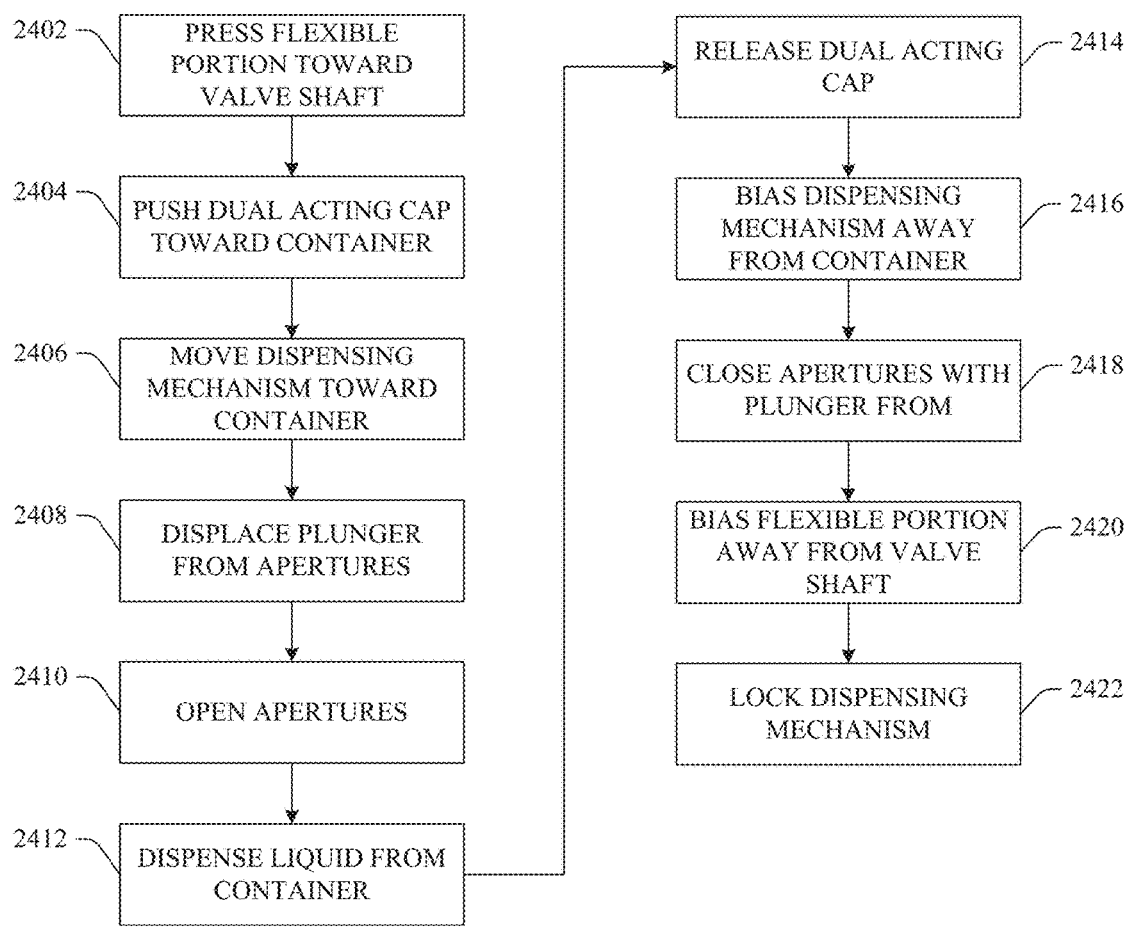
FIG. 24 is a block diagram illustration illustrating a method of dispensing a liquid using the spout assembly in accordance with an aspect of the innovation.

Referring to FIG. 24, a method of dispensing a liquid from the container 50 according to an embodiment of the innovation will now be described. At 2402, once the container is positioned in a dispensing state, the user presses the flexible portion 520 toward the valve shaft 502 in a direction indicated by the arrow A (see FIG. 18). At 2404, the user then pushes on the dual acting cap 518 toward the container 50 as indicated by the arrow B in FIG. 18. At 2406, the dispensing mechanism 504 is moved toward the container 50. At 2408, the plunger 517 is displaced from the apertures 514. At 2410, the apertures 514 in the liquid stop mechanism 512 are opened. At 2412, the liquid is dispensed from the container 50. At 2414, once the liquid is dispensed, the user releases the dual acting cap 518. At 2416, and the spring/actuation device 516 biases the dispensing mechanism 504 away from the container 50 (opposite direction of arrow B). At 2418, the plunger 517 closes the apertures 514 to prevent any further dispensing of the liquid. At 2420, the flexible portion 520 is biased in a direction away from the valve shaft (opposite direction of arrow A). At 2422, the dispensing mechanism 504 is locked.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A liquid dispensing spout assembly, comprising:
   a housing having a first cylindrical portion and a second cylindrical portion attached at an angle to the first cylindrical portion;
   a spout attached to the second cylindrical portion; and
   a valve assembly, the valve assembly including a valve shaft disposed inside the first cylindrical portion and a trigger mechanism atop the valve shaft, the trigger mechanism including a dual acting cap having a flexible portion with a tab disposed thereon, and requiring the two-step process of pressing the flexible portion toward the valve shaft until the tab clears a top of a first end of the first cylindrical portion and pushing on the dual acting cap to position the tab inside the first cylindrical portion to actuate the valve assembly, wherein actuation of the valve assembly is required for dispensing liquid through the spout.

2. The liquid dispensing spout assembly of claim 1, further comprising a cap having a flexible extension part, wherein the flexible extension part includes a plurality of teeth to engage a projection on a liquid dispensing container to prevent removal of the cap from the liquid dispensing container without actuating the flexible extension part.

3. The liquid dispensing spout assembly of claim 1, further comprising a dust cap configured to cover a dispensing end of the spout.

4. The liquid dispensing spout assembly of claim 3, wherein the dust cap includes a lip that engages a dust cap storage device.

5. The liquid dispensing spout assembly of claim 1, wherein the valve assembly further includes a dispensing mechanism disposed in the valve shaft, and actuation of the dispensing mechanism is required to actuate the valve assembly.

6. The liquid dispensing spout assembly of claim 5, wherein the trigger mechanism requires the two-step process to actuate the dispensing mechanism.

7. The liquid dispensing spout assembly of claim 6, wherein the valve assembly further includes an actuation device disposed on the dispensing mechanism, actuation of the actuation device is required to actuate the dispensing mechanism, and the trigger mechanism requires the two-step process to actuate the actuation device.

8. The liquid dispensing spout assembly of claim 5, wherein the valve assembly further includes a plunger disposed at a bottom of the dispensing mechanism, wherein when the dispensing mechanism is actuated, the plunger opens an aperture to allow the flow of liquid, and when the dispensing mechanism is not actuated, the plunger closes the aperture.

9. The liquid dispensing spout assembly of claim 1, wherein the valve assembly further includes an O-ring disposed on the valve shaft that acts as a stop for the trigger mechanism.

10. The liquid dispensing spout assembly of claim 1, further comprising a vent disposed inside a lower portion of the first cylindrical portion and throughout the second cylindrical portion.

11. The liquid dispensing spout assembly of claim 10, wherein the vent extends along an inside surface of the spout and an inside surface of the second cylindrical portion, and continues along an inside surface of the first cylindrical portion.

12. A method of dispensing liquid from a container, comprising:
    while gripping a first cylindrical portion of a housing, pressing a flexible portion of a trigger mechanism atop a valve shaft disposed inside the first cylindrical portion toward the valve shaft, and pushing the trigger mechanism toward the container in combination with pressing the flexible portion toward the valve shaft, wherein pressing the flexible portion toward the valve shaft is required to push the trigger mechanism toward the container;
    moving a dispensing mechanism toward the container by pushing the trigger mechanism toward the container;
    displacing a plunger disposed at a bottom of the valve shaft to open an aperture by moving the dispensing mechanism toward the container; and
    dispensing liquid from the container and through a spout attached to a second cylindrical portion of the housing attached at an angle to the first cylindrical portion by displacing the plunger to open the aperture.

13. The method of claim 12, further comprising releasing the trigger mechanism, biasing the dispensing mechanism away from the container by releasing the trigger mechanism, and closing the aperture with the plunger by biasing the dispensing mechanism away from the container.

14. The method of claim 13, further comprising biasing the flexible portion away from the valve shaft, and locking the dispensing mechanism to stop dispensing liquid from the container by biasing the flexible portion away from the valve shaft.

15. The method of claim 12, wherein pressing the flexible portion toward the valve shaft includes pressing the flexible portion toward the valve shaft until a tab disposed on the flexible portion clears a top of a first end of the first cylindrical portion, and pushing the trigger mechanism toward the container includes positioning the tab inside the first cylindrical portion.

16. An apparatus, comprising:
    a container; and
    a spout assembly attached to the container, the spout assembly comprising:
        a housing having a first cylindrical portion and a second cylindrical portion attached at an angle to the first cylindrical portion;
        a spout attached to the second cylindrical portion;
        a vent disposed inside a lower portion of the first cylindrical portion and throughout the second cylindrical portion; and
        a valve assembly disposed inside the first cylindrical portion, wherein actuation of the valve assembly is required for dispensing liquid through the spout, wherein the valve assembly includes an actuation device disposed on a dispensing mechanism and a trigger mechanism that requires a two-step process to activate the dispensing mechanism to dispense liquid from the container, wherein the trigger mechanism includes a dual acting cap having a flexible portion with a tab disposed on the flexible portion, and wherein pressing of the flexible portion toward a valve shaft until the tab clears a top of a first end of the first cylindrical portion and pushing on the dual acting cap toward the container actuates the valve assembly.

17. The apparatus of claim 16, wherein the spout assembly is operatively connected to the container via an attachment cap.

18. The apparatus of claim 17, wherein the attachment cap includes a flexible extension part and outwardly extending teeth, wherein the outwardly extending teeth engage at least one projection on the container.

19. The aparatus of claim 16, wherein the valve assembly further includes an O-ring disposed on the valve shaft that acts as a stop for the trigger mechanism.

20. The apparatus of claim 16, wherein the valve assembly further includes a plunger disposed at a bottom of the dispensing mechanism, wherein when the dispensing mechanism is actuated, the plunger opens an aperture to allow the flow of liquid, and when the dispensing mechanism is not actuated, the plunger closes the aperture.

\* \* \* \* \*

UNITED STATES PATENT AND TRADEMARK OFFICE
CERTIFICATE OF CORRECTION

PATENT NO. : 10,427,843 B2  
APPLICATION NO. : 15/696693  
DATED : October 1, 2019  
INVENTOR(S) : Julien et al.

Page 1 of 1

It is certified that error appears in the above-identified patent and that said Letters Patent is hereby corrected as shown below:

In the Claims

Column 8, Line 55: replace "aparatus" with --apparatus--

Signed and Sealed this  
Twenty-fifth Day of February, 2020

Andrei Iancu  
*Director of the United States Patent and Trademark Office*